2 Sheets--Sheet 1.

J. BENNOR.
Mechanical Movements.

No. 155,486. Patented Sept. 29, 1874.

Witnesses
Thomas J. Bewly.
George C. Hatzel

Inventor
Joseph Bennor
By His Attorney
Stephen Ustick

2 Sheets--Sheet 2.

J. BENNOR.
Mechanical Movements.

No. 155,486.  Patented Sept. 29, 1874.

Witnesses
Thomas J. Dewley.
George C. Hetzel

Inventor
Joseph Bennor
By His Attorney
Stephen Ustick

UNITED STATES PATENT OFFICE.

JOSEPH BENNOR, OF PHILADELPHIA, PENNSYLVANIA.

IMPROVEMENT IN MECHANICAL MOVEMENTS.

Specification forming part of Letters Patent No. 155,486, dated September 29, 1874; application filed September 3, 1874.

*To all whom it may concern:*

Be it known that I, JOSEPH BENNOR, of the city and county of Philadelphia, in the State of Pennsylvania, have invented a Mechanical Movement, of which the following is a specification:

My invention relates to producing a complete rotary movement in a series of shafts running in the same direction by means of an eccentric on a driving-shaft, in combination with an eccentric strap having one or two stems or rods at radiuses and in line with each other, the rods being kept in parallel positions through the whole revolution of the shaft by means of a rock-shaft or slide. Hence a uniform movement is given each way from left to right, and vice versa, and a reciprocating movement each way at right angles to the eccentric strap, whereby a rotary motion is imparted to any desirable number of shafts connected therewith by means of cranks.

For producing a regular or uniform movement to the shafts the crank-pins have a positive position at all times from the centers of the shafts. An irregular or differential movement is given to one or more shafts by one or more pins which project from the eccentric strap, or parts attached moving in a radial slot of the crank.

Figure 1:
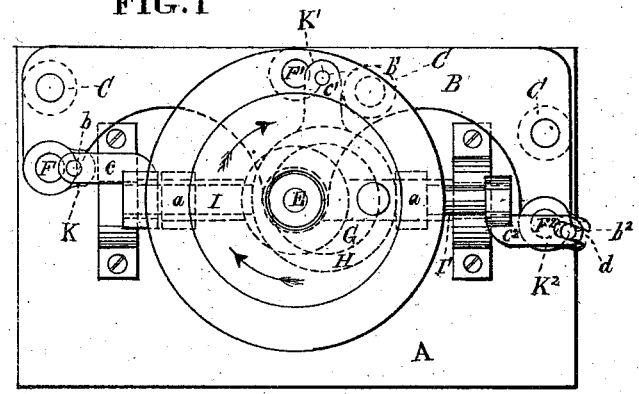
Figure 2:
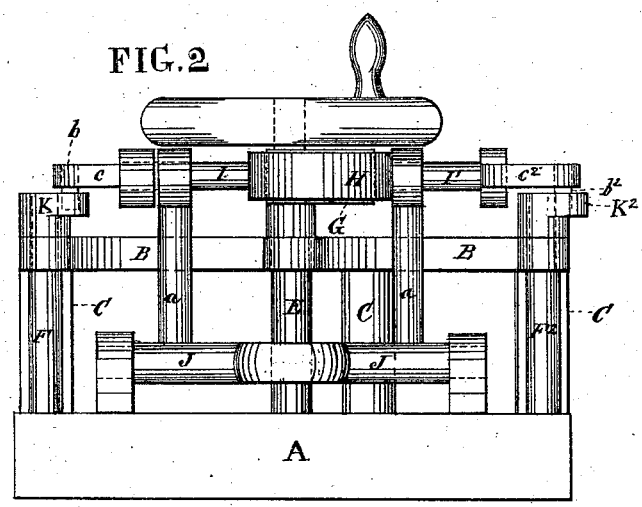
Figure 3:
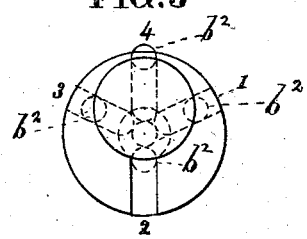
Figure 4:
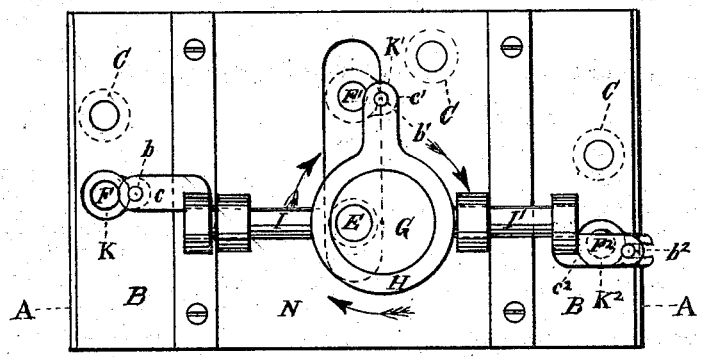
Figure 5:
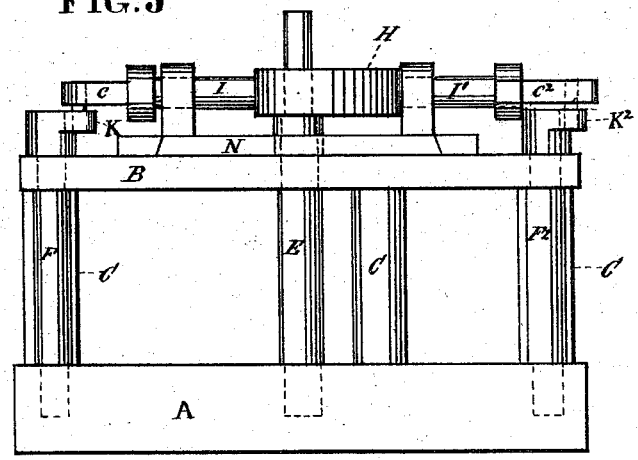

In the accompanying drawings, Figure 1 is a plan view of the device. Fig. 2 is a side elevation of the same. Fig. 3 is a diagram explanatory of a differential movement of the shaft $F^2$. Figs. 4 and 5, Sheet 2, are, respectively, top and edge views of the slide N, in connection with the rods I I' of the eccentric strap H.

Like letters of reference in all the figures indicate the same parts.

A is the bed-plate, and B a parallel plate connected therewith by means of any suitable number of columns, C C C. Between these plates any desired number of revolving shafts are situated which have their bearings in the plates. In the present case E is the driving-shaft, and F, $F^1$, and $F^2$ shafts driven thereby. The driving-shaft is provided with an eccentric, G, which has an eccentric strap, H, provided with rods or stems I and I', which have a reciprocating movement in the upper ends of the arms $a\ a$ of the rocking shaft J, so that as the driving-shaft E is revolved, carrying the eccentric G, the rods I I' of the eccentric strap have a reciprocating movement in the arms $a\ a$ lengthwise from left to right, and vice versa, and, by the reciprocating movement of the arms of the rock-shaft, are kept in parallel positions at all times in their reciprocating movements, at right angles to their longitudinal movements. As the movements in all directions thus given are equal in extent, a complete rotatory movement of all the shafts connected with any part of the eccentric strap H or its rods I I' must be given; and hence any desirable number of shafts may be rotated by the same means, the shafts having either a regular rotatory movement or differential movement, according to their connections with the eccentric strap H or its rods I and I'. The shafts F and $F^1$ have cranks K and K', which have pins $b$ and $b^1$. The pin $b$ has a joint connection with the extension-piece $c$ of the rod I, and the pin $b^1$ of the crank K' a like connection with the extension $c^1$ of the eccentric strap H, so that, as the driving-shaft E is revolved in the direction of the arrows, a uniform rotatory movement is given to the shafts F and F', the same leverage being retained during the whole revolution of the shafts, as when driven by means of gear-wheels. The rod I' has an extension-piece, $c^2$, which has a joint connection with the crank $K^2$, there being a pin, $b^2$, of the extension-piece $c^2$, which projects downward into the slot $d$ of the crank, so as to have a reciprocating movement therein toward and from the center of the shaft $F^2$, as the reciprocating movements are given to rod I of the eccentric strap H by the revolution of the driving-shaft E, as above described, and thus producing a differential movement of the shaft $F^2$, as illustrated by the diagram, Fig. 3. In reference to the diagram, as the crank-pin $b^2$ passes from the point 1 to the point 2 one-fourth of a revolution of the driving-shaft, it approaches the center of the shaft $F^2$ and turns it one-third around; and in going from the point 2 to the point 3 the same result is produced. In going from 3 to 4 it turns the shaft one-sixth around, and from the point 4 to the point 1, the starting-point, the shaft is turned the remaining one-sixth of its revolution. More or less differential movement may be given to the shaft by varying the length of the stroke of the pin $b^2$ in the crank-slot $d$.

As shown in Fig. 1, the form of the extension-pieces $c$ and $c^2$ are made to suit the localities of the shafts with which they are connected.

A reciprocating movement may be given to a shaft or shafts by connecting a crank of the same with the rocking-shaft by means of a connecting-rod, or a reciprocating sliding movement may be given to a device by any suitable connection with the arms $a\ a$. If desired, the rocking-shaft J may be dispensed with by the use of a slide, N, connected with the rods I I' of the eccentric strap H, as shown in Figs. 4 and 5.

I claim as my invention—

1. An eccentric strap having one or two radial rods, in combination with an eccentric of a driving-shaft, and being kept in a parallel position during the whole revolution of the eccentric, by means of a rocking shaft or slide, for producing a complete rotary movement of a series of shafts running in the same direction, substantially as described.

2. The combination of the crank K of the shaft F with the eccentric strap H, for producing a uniform rotatory motion of said shaft, substantially as described.

3. The combination of the slotted crank $K^2$ of the shaft $F^2$ with the eccentric strap H, for giving a differential movement to the shaft, substantially as set forth.

JOSEPH BENNOR.

Witnesses:
   THOMAS J. BEWLEY,
   STEPHEN USTICK.